US007359783B2

(12) United States Patent
Vives et al.

(10) Patent No.: US 7,359,783 B2

(45) Date of Patent: Apr. 15, 2008

(54) METHOD OF DETECTING OBSTRUCTIONS CAUSED BY MOTOR-DRIVEN POWER WINDOWS AND SIMILAR DEVICES USING FUZZY LOGIC ALGORITHMS

(75) Inventors: Jordi Bigorra Vives, Tarragon Valls (ES); Antoni Ferre Fabregas, Tarragon Valls (ES); Josep Samitier Marti, Tarragon Valls (ES); Atila Herms Berenguer, Tarragon Valls (ES); Sebastià Bota Ferragut, Illes Balears (ES); Agustin Gutierrez Galvez, Tarragon Valls (ES); Jose Luis Merino Panades, Tarragon Valls (ES); Francisco Javier Garcia Hernando, Tarragon Valls (ES); Rafael Jimenez Pino, Tarragon Valls (ES)

(73) Assignee: Lear Corp., Southfield, MI (US)

( * ) Notice: Subject to any disclaimer, the term of this patent is extended or adjusted under 35 U.S.C. 154(b) by 756 days.

(21) Appl. No.: 10/710,208

(22) Filed: Jun. 25, 2004

(65) Prior Publication Data

US 2005/0187688 A1 Aug. 25, 2005

(30) Foreign Application Priority Data

Dec. 27, 2001 (WO) ..................... PCT/ES01/00508
Jul. 31, 2003 (WO) ......................... WO 03/063318

(51) Int. Cl.
*G06F 17/00* (2006.01)

(52) U.S. Cl. ........................... 701/49; 701/36; 318/45; 318/453; 318/446; 318/282; 318/266; 318/565; 318/484; 318/469; 700/50

(58) Field of Classification Search .................. 701/49, 701/36; 318/465, 453, 446, 282, 266, 565, 318/484, 469; 700/50
See application file for complete search history.

(56) References Cited

U.S. PATENT DOCUMENTS 5,399,950 A * 3/1995 Lu et al. ..................... 318/565
5,525,876 A * 6/1996 Filippi ........................ 318/282
5,530,329 A * 6/1996 Shigematsu et al. ........ 318/469
5,734,245 A * 3/1998 Terashima et al. .......... 318/453
5,945,796 A * 8/1999 Ohmori et al. ............. 318/266
5,949,207 A * 9/1999 Luebke et al. .............. 318/446
6,064,165 A * 5/2000 Boisvert et al. ............ 318/465
6,297,609 B1 * 10/2001 Takahashi et al. .......... 318/484
6,404,158 B1 * 6/2002 Boisvert et al. ............ 318/469
6,456,916 B1 * 9/2002 Edgar et al. .................. 701/49
6,499,359 B1 * 12/2002 Washeleski et al. ... 73/862.473
6,548,979 B2 * 4/2003 Boisvert et al. ............ 318/469

(Continued)

*Primary Examiner*—Thomas Black
*Assistant Examiner*—Wae Louie
(74) *Attorney, Agent, or Firm*—Bruce E Harang

(57) ABSTRACT

The mobile element is a vehicle window pane, panel, movable seat or similar, conveniently guided, and driven by a DC electric motor with a permanent magnet, and the method comprises a step of detecting an entrapment or collision situation of the mobile element by means of a first fuzzy logic algorithm, which inputs are the mobile element's position and the increments that may occur in the intensity of the current demanded by said motor, which is evaluated from the relative increase of the current intensity at one turn of the motor and after one next, subsequent turn of the motor. A second fuzzy logic algorithm is used to control the mobile element's velocity, in close loop.

11 Claims, 2 Drawing Sheets

Current (A)
30
25
20
15
10
5
0
-5
Current differences (A)
2.1
1.6
1.1
0.6
0.1
-0.4
100
5681
5481
Current
Force
differences

U.S. PATENT DOCUMENTS

| | | | | |
|---|---|---|---|---|
| 6,555,982 | B2 * | 4/2003 | Tyckowski | 318/465 |
| 6,739,212 | B2 * | 5/2004 | Flynn | 74/512 |
| 6,766,273 | B2 * | 7/2004 | Kahles | 702/177 |
| 6,782,759 | B2 * | 8/2004 | Shank et al. | 73/780 |
| 6,882,123 | B1 * | 4/2005 | Guasch Murillo | 318/264 |
| 7,070,013 | B1 * | 7/2006 | Kuebler et al. | 180/65.1 |
| 7,073,291 | B2 * | 7/2006 | Kawanobe et al. | 49/26 |
| 7,132,642 | B2 * | 11/2006 | Shank et al. | 250/221 |
| 2005/0187688 | A1 * | 8/2005 | Bigorra Vives et al. | 701/49 |
| 2006/0229781 | A1 * | 10/2006 | Nishimura et al. | 701/36 |
| 2007/0045052 | A1 * | 3/2007 | Stanley et al. | 187/382 |

* cited by examiner

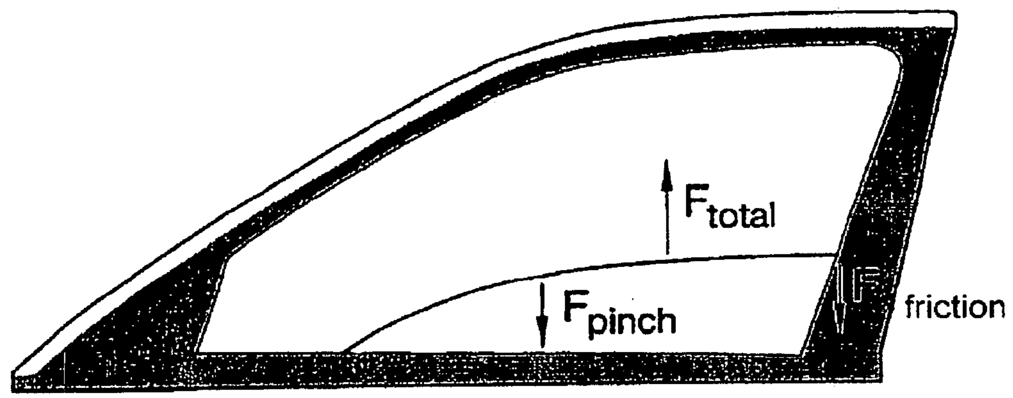
FIG.1
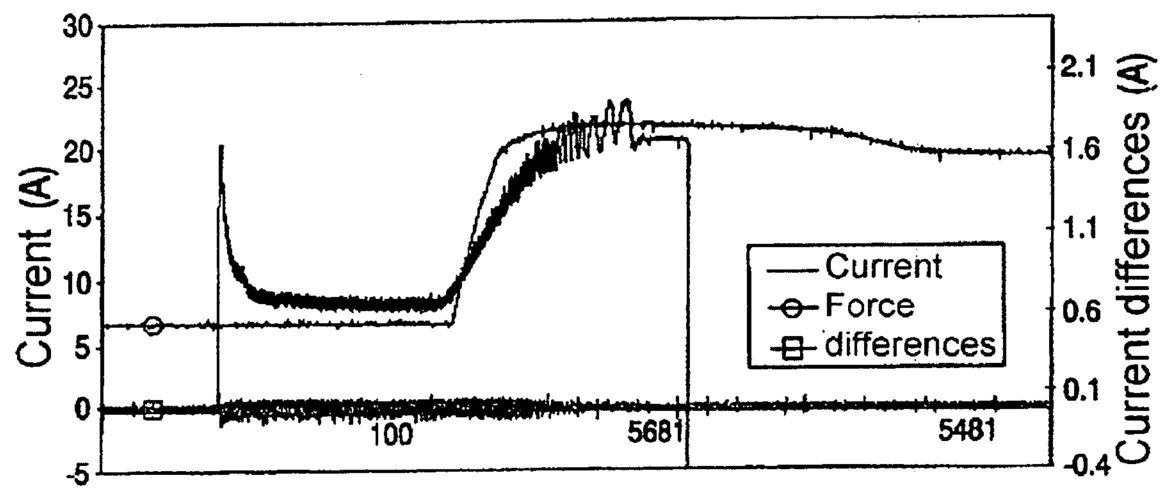
FIG.2
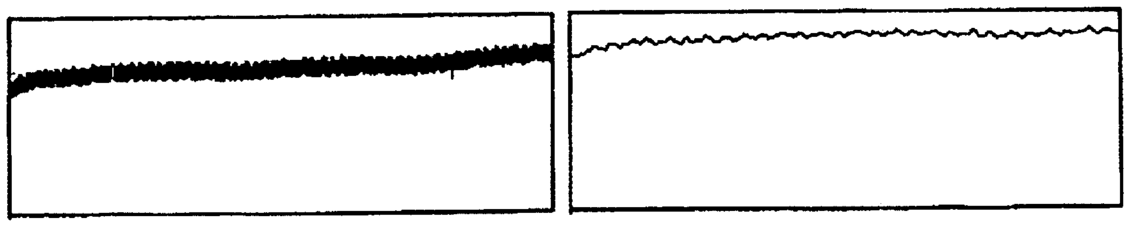
FIG.3a
FIG.3b

METHOD OF DETECTING OBSTRUCTIONS CAUSED BY MOTOR-DRIVEN POWER WINDOWS AND SIMILAR DEVICES USING FUZZY LOGIC ALGORITHMS

BACKGROUND OF INVENTION

1. Field of the Invention

The present invention falls within the field of control methods for electromechanical assemblies and provides a method and means for controlled management of a mobile element, driven by an electric motor with a safety mechanism to avoid an injuring action by said element whether against a part or limb of a user, causing crushing, or against an object or structural part against which said mobile element might be susceptible of colliding in its movement, immediately and automatically adopting in the face of such an event suitable countermeasures, thus stopping and reversing the displacement movement of said mobile element.

The invention is particularly applicable to a window panel opening device for a vehicle, driven by a DC electric motor with a multi-polar permanent magnet, with a safety mechanism so as to not entrap and/or exercise a crushing force on an object interposed in the trajectory of said window pane, such as a limb or part of a person, even though its field of application can be generalized to any kind of mobile panel or window pane driven by an electric motor of such features, being its main objects precision in detection and speed of response and consequently the possibility it offers for the near-immediate adoption of the aforementioned countermeasures to avoid said non-desired entrapment or crushing situation and progress thereof.

The proposed method is also adequate for controlling an electromechanically guided seat, avoiding collisions against other vehicle parts or strikes against user parts eventually interposed in the trajectory of the mobile element.

The invention also provides some programs, loadable into the internal memory of a computer, to perform several of the steps of the method according to the invention, particularly the entrapment or collision detection algorithm, and a velocity control auxiliary algorithm.

2. Description of the Related Art

In relation with electronic control devices, with anti-crushing safety, associated to an electric motor, intended to drive a panel such as a vehicle's window pane or another similar mobile element, many executions of systems and methods are known, being capable of mentioning patents EP-A-267064, DE-A-4315637, EP-A-714052, U.S. Pat. Nos. 6,002,228, 5,994,858, 5,983,567, 5,949,207, and 5,945,796.

In the methods and systems disclosed in the cited patents generally the use of position detectors and current sensors is proposed, so as to provide information intended to run a control algorithm. In some of the patents there is also mention of the use of detectors of the motor's angular velocity and/or detectors of said motor's driving torque.

Patent U.S. Pat. No. 6,273,492 refers to an operative mechanism to actuate the top of a convertible vehicle, where, in the case of use of a DC motor, it is proposed that an electronic control performs detection and calculation of voltage and current peaks by means of, among several alternatives, switching the motor (ripple counting technique).

DESCRIPTION OF THE INVENTION

The invention refers to a method for the controlled management of a moving element, driven by an electric motor, with anti-entrapment or anti-collision safety, said element being mobile, e.g. a vehicle's window pane or panel, a movable seat or the like, which is conveniently guided and is driven by a DC electric motor with a multi-polar permanent magnet.

The method comprises three differentiated parts: detection of the rippling peaks of the current to determine the position and velocity of the movable element to be controlled; control of the velocity and detection of a situation of entrapment or collision, using for the last two parts a fuzzy logic algorithm.

According to the invention, from the position of said mobile element and the relative increase of the DC driving motor's current intensity, corresponding to consecutive intervals, a base of rules to implement a first fuzzy logic algorithm for the detection of entrapment or collision situations has been built. Setting of the fuzzy terms used in the algorithm has been performed based on the experimental setting.

Since said DC electric motor is formed by multiple poles, its polarization current shows continuous rippling. This rippling has been used, in the first place, to determine the window's position (by counting the rippling peaks, according to the ripple counting technique, known in itself) and to calculate the relative increment of the current intensity. To increase the information linked to said current intensity increment, said increment corresponds to measures taken in one of the rippling peaks (it is always measured in a peak corresponding to the same motor pole).

Thus, and in greater detail, according to the invention, the performance of detection of a situation of entrapment of an object or limb interposed in the cited mobile element's travel or of a possible collision of said mobile element is proposed by means of a first algorithm based on fuzzy logic whose inputs are the cited mobile element's position and the increments that may take place in the current consumed by the motor. In particular, the relative increase of the current intensity occurring at one turn of the motor and said relative increase of the intensity generated after a later, near turn of the motor, especially the third, immediately subsequent, i.e. the eventual increments of the intensity in one turn and in three turns of the motor, are considered.

The information on the mobile element's position is known at every moment through detection of the motor's polarization current rippling by means of the variation of the sampling frequency.

The invention also proposes an additional step of control of the mobile element's velocity, in closed loop, using a second fuzzy logic algorithm with information input to the same on a desired or reference velocity, and evaluation of the deviation relative to said reference of the actual velocity. The fuzzy logic system used has as inputs the mobile element's velocity at every instant and the desired velocity for that instant, and outputs the duty cycle of the PWM. Velocity control through fuzzy logic allows a small response time to load variations applied to the motor, by which a rather precise velocity control is obtained, with little use of the resources of a microcontroller used for its implementation.

The method works in such a way that, when detecting an increase in the motor's demand current intensity of a certain slope, the power fed to the motor decreases instantaneously. Then, two possible evolutions of said intensity may occur, a relevant reduction in the slope, in which case the reason for that increase in intensity would be due to a velocity-dependent friction or to a slight reduction in the slope indicative of the existence of a load independent of the velocity, there being detected an entrapment or a collision.

According to the invention, in order to evaluate the relative increments of the current consumed by the motor that may occur, the polarization current rippling peaks of said motor measured for a same motor inductor, i.e. those intensity values having the same phase within the oscillation of the current, are used.

Alternatively, in order to evaluate the relative increments of the current consumed by the motor that may occur, an average of the preceding values of said current is used.

According to the method proposed herein, faced with a situation detected by said first fuzzy logic algorithm, wherein said captured current increments are susceptible of being created by an object trapped in the trajectory of the mobile element or by a collision of said mobile element in its travel, the duty cycle of the motor's feed current is reduced at 90 percent by means of PWM (pulse width modulation) to discern, then applying again said first fuzzy logic algorithm, whether said current intensity increment, such as a sudden increase, is due to an external force applied to the mobile element or to a stress derived from friction of said mobile element with some guiding parts thereof on its displacement.

Alternatively, faced with a situation such as the one described in the preceding paragraph, and after a first execution of said first fuzzy logic algorithm, by means of PWM the velocity of the motor is reduced from 30 to a 50 percent so as to discern, then applying again said first fuzzy logic algorithm, whether said current intensity increment, such as a sudden increase, is due to an external force applied to the mobile element or to a stress derived from friction of said mobile element with some guiding parts thereof on its displacement.

For a better understanding of the features of the invention, the same will be detailed with reference to some sheets of drawings in which an execution example consisting in the application of the method to the case of the control of a vehicle's window has been illustrated, making reference hereon to the entrapment or crushing situation by means of said terms or alternatively and indistinctly as "pinch", entrapment, or crushing, and the measures to be adopted as "anti-pinch" or anti-entrapment, due to said anglophone terms being widely used in the sector.

BRIEF DESCRIPTION OF DRAWINGS

In FIG. 1 the forces acting on a window during an entrapment or pinch situation are schematically shown.

In FIG. 2 the current differences between to consecutive intensity samples are illustrated, showing that when a force is applied, the graph does not show any noticeable change.

In FIG. 3*a* the motor's feed current is illustrated, and in FIG. 3*b* only considering the peaks according to that proposed by the invention.

In FIG. 4 the membership functions for the maximum input 10 are shown;

in FIG. 5 the membership functions of the maximum input 30;

Figure 6:
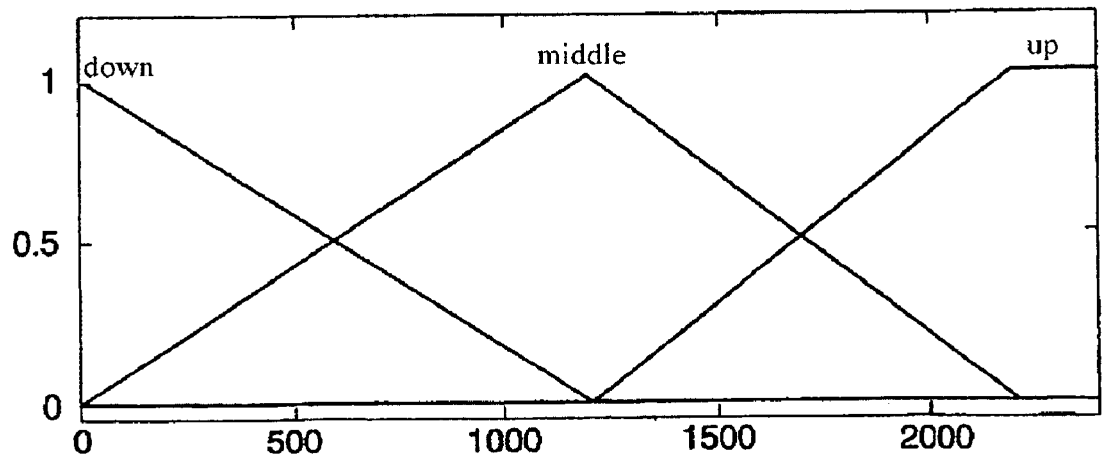

and in FIG. 6 the membership functions of the position input.

DETAILED DESCRIPTION

As indicated, the entrapment and/or possible crushing of and object by a vehicle's window when raising it in automatic mode will generally be designated as pinch. During normal operation of a vehicle's window, e.g. an automobile, this object can be a part of the human body, such as a hand or a finger, or even the neck. Therefore, in the example being explained, the object of every anti-pinch or control management method of a mobile element, conveniently guided and driven by a DC electric motor, such as a window, is to avoid this situation. In order to do so, the control system must be capable of detecting the presence of any object being in the window's trajectory.

The proposed control method must perform the following actions:

a) raise and lower the window in manual or automatic mode, when indicated by means of command push buttons;

b) stop the motor when the window reaches the upper or lower limits;

c) perform control of the window's velocity; and d) in automatic raising mode it must detect whether an object is trapped between the window and the window's upper frame.

The last function is the one of hardest execution considering that the method has to be capable of detecting a force of 60 N applied to the window in a time of 10 ms, according to the sector's normative specifications.

The invention proposes performing pinch detection by means of a first algorithm based on fuzzy logic using as input the information provided by the current intensity that reaches the window's motor and by the position.

The intensity value of the current consumed by the motor depends on the force exerted on the window, thus increasing the force increases the current. The entrapment will create a sudden increment of the current, which in principle should be easily detectable whether the value reached by the motor's current in a normal operation regime is known. However, there is a factor, the friction that the window suffers, that makes the total force not constant during the whole raising process. This friction under real conditions may vary due to the condition of the window's frame and guides, the effect of the ambient temperature, other climatic conditions and additional reasons. Thus, said current value may vary in a rather unpredictable manner during different moments in the car's life. This causes that a fixed reference value with which to compare the instantaneous value of the motor's intensity, in order to detect an entrapment condition, cannot be used.

To develop the algorithm, it is necessary to know which are the forces acting on the window at every moment. In FIG. 1 the scheme of the forces acting on the window during an entrapment is shown.

The electric work supplied to the motor is expressed by:

$$W_{electric} = V \cdot I \cdot t$$

where V is the voltage applied to the motor, I is the motor's current intensity, and t is the time. This electric work is converted to mechanical work by the motor, transforming it in the window's movement. The work performed by the window is:

$$W_{window} = F_{total} \cdot s$$

where $F_{total}$ is the force transmitted by the motor to the window, and s is the space traveled by the window.

Not all the electric work supplied to the motor is transmitted to the window, there is a part transformed into heat in the window's electromechanical system, such that:

$$W_{window}=\square\cdot W_{electric}$$

η is the work transmission efficiency.

In an entrapment situation of an object, or pinch, the force transmitted by the motor to the window can be considered equal in modulus to the friction force and to the force exerted by the object, that is:

$$F_{total}=F_{pinch}+F_{friction}$$

Therefore, the force exerted by the object may be expressed in the following way:

$$F_{pinch}=F_{total}-F_{friction}=\eta\cdot V\cdot I\cdot t/S-F_{friction}$$

For a certain transmission $T_{motor}$ relationship of the motor's angular displacement relative to the window's linear displacement, s and t can be related through the motor's angular velocity or its inverse, the period T.

$$s=T_{motor}\cdot \text{rpm}\cdot t=T_{motor}\cdot t/T$$

Thus the force exerted by an entrapment or pinch will be expressed in the following way:

$$F_{pinch}(t)=\eta(V)\cdot V(t)\cdot I(t)\cdot T(t)/T_{motor}-F_{friction}(t)$$

When a pinch occurs, $F_{pinch}$ increments in a short period of time. The only factor in the right hand side of the equality that can answer to the fast increase of $F_{pinch}$ is the current intensity I(t). Therefore, according to the proposals of this invention, the use of the difference between the present current intensity value and a preceding value, close, for pinch detection is proposed. Thereby, the effect created by friction is avoided or effectively counteracted since, even though it varies unpredictably, the changes are not too sudden. Therefore, when making a subtraction of the current intensity value relative to a close preceding value, the friction can be considered as constant during this interval, ensuring that this variation of the current intensities is a consequence only of the force applied by the pinch effect.

The parameters used for pinch detection according to the proposed method are detailed below.

For detection of the entrapment of an object the information provided by two parameters will be considered:

(i)the position of the window (ii)the relative increase of the current intensity.

The first parameter is useful since in the great majority of cases entrapment occurs in the upper part of the window's run, i.e. when it is near the upper frame. Therefore, it is intended for the system to be a lot more sensible in the final zone of the window's run. The window's position can be known at every moment by counting the intensity pulses related to the motor's multi-polar nature (ripple counting technique, known in itself).

The second factor, the relative increase of the intensity, will allow detecting sudden increments in the force exerted on the window. Although apparently the calculation of this parameter can seem simple, by simply making a subtraction between two values of the intensities of the currents, certain problems arise if the intensity values of the current to be subtracted are not properly selected.

To increase the anti-pinch system's reaction time, the first solution analyzed by the inventors was that of subtracting the present current intensity value to the current intensity value sampled in the preceding instant. However, it was confirmed that the obtained result is affected by the current rippling. According to the sampling frequency used, the intensity differences will be affected by higher frequency variations associated to the effect of the motor poles, situation reflected in FIG. 2 of the drawings.

To avoid this problem the inventors have provided for several solutions:

(i)Using an average of the preceding current intensity values, thereby having a stable reference without oscillations.

(ii)Finding current intensity values that are representative of the increase of the force on the window and thus avoiding the ripple effect.

However the first solution, although apparently simpler, has two drawbacks with regard to the second one, which are: the lower precision when detecting a pinch and, therefore, a longer response time, and the need to use more memory and more time of a microcontroller used in the support equipment for implementing said solution.

In the second solution those intensity values having the same phase within the current oscillation are used. This feature is fulfilled by the rippling peaks.

However, it is observed (see FIGS. 3*a* and 3*b*) that the peak values still show a certain oscillation. This is so because the current through each one of the ten coils of the DC electric motor is not exactly the same but slightly varies. To avoid said problem introduced by the current oscillation, the difference between those current values corresponding to the same coil will be used. That is, the present peak's current value will have subtracted the current value of the peak corresponding to the same coil during the preceding turn.

Using only the peaks for pinch detection involves a limitation in the frequency at which the method can operate (the anti-pinch algorithm's operating range), as it will only check whether pinching occurs each time a peak occurs. However, this is compensated by the precision attained.

Once the parameters used by the algorithm are defined, disclosure of the steps and structure of said algorithm based on fuzzy logic for pinch detection proceeds below.

As indicated, the inputs to the fuzzy system are: the window's position, the relative increase of the current intensity at one turn of the motor, and the relative increase of the current intensity at three turns of the motor.

It has been deemed convenient to introduce two inputs referring to the increase of the current intensity for two reasons. In the first place, in order to have two close references that, although similar, provide us with different information. Secondly, in order to make the system more error-tolerant as anti-pinch will not be detected unless both inputs provide high values.

To find the membership functions of the inputs coming from the intensity, this signal's value has been calculated, under different friction conditions and taking into account the whole window run, including an entrapment at the end. The average of the signal's values before reaching the pinching is calculated. This average value has been used for placing the middle point of the membership function Z (zero, it is the middle one). The width of this membership function, corresponding to the middle points of the other two membership functions, has been set depending on the system's response according to the experimental results.

The membership functions of the input corresponding to the position have been chosen dividing the total space traveled by the window in three areas. Reflected in the basis for the rules is that the sector where pinching is more likely to occur is the area nearest the window frame.

Figure 4:
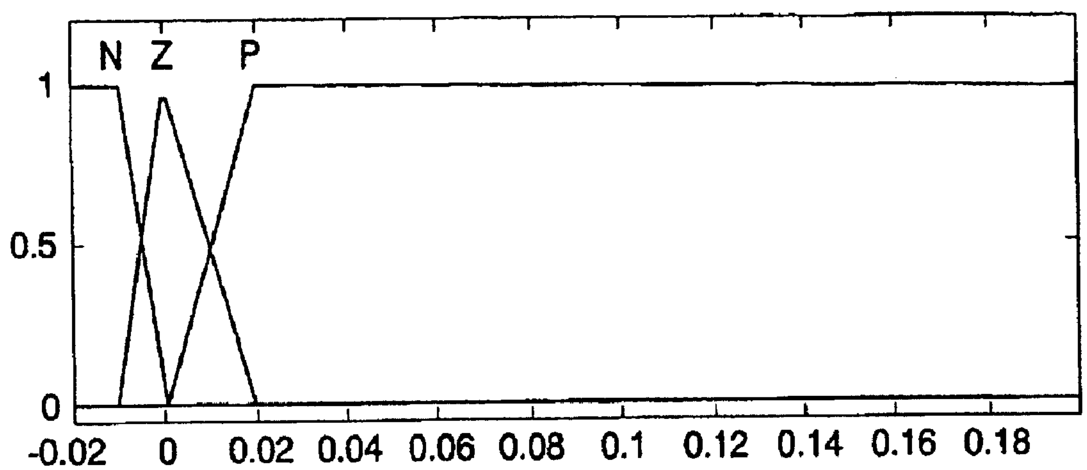
FIGS. 4 to 6 illustrate the fuzzy logic system's descriptive membership functions used for pinch detection, from which the basis for its rules will be disclosed.
Figure 5:
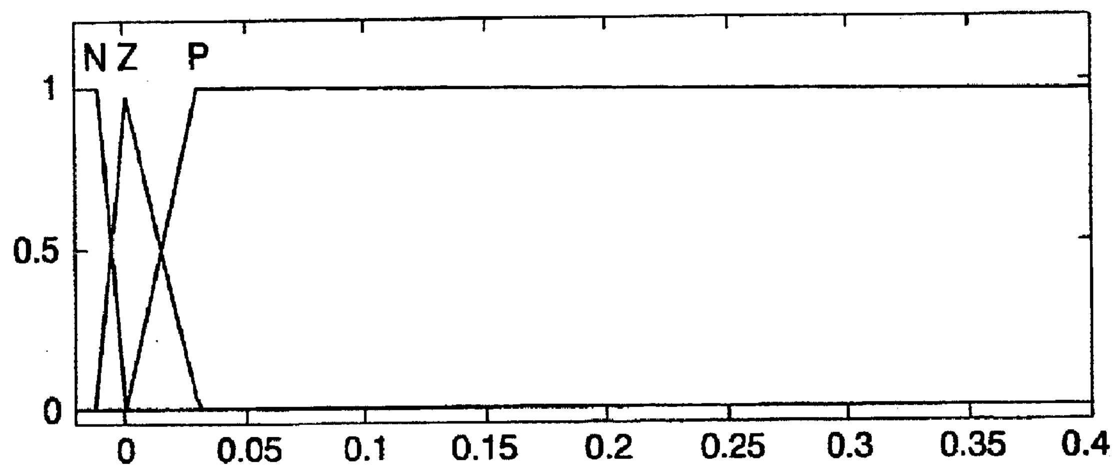

The fuzzy logic system used has the features which reflect the membership functions of FIGS. 4, 5, and 6, which are self-explanatory, there being indicated in the case of the first two Figures, the probability in the ordinates, and the difference detected between intensities in abscissas, and in the third Figure, in its axis of abscissas the number of counted rippling peaks (ripples).

The basis used for the fuzzy logic system's rules is:

IF max10=N AND max30=N AND position=low THEN output=0

IF max10=Z AND max30=N AND position=low THEN output=0

IF max10=P AND max30=N AND position=low THEN output=0

IF max10=N AND max30=Z AND position=low THEN output=0

IF max10=Z AND max30=Z AND position=low THEN output=0

IF max10=P AND max30=Z AND position=low THEN output=0

IF max10=N AND max30=P AND position=low THEN output=0

IF max10=Z AND max30=P AND position=low THEN output=0

IF max10=P AND max30=P AND position=low THEN output=0

IF max10=1 AND max30=1 AND position=middle THEN output=0

IF max10 =Z AND max30=1 AND position=middle THEN output=0

IF max10=P AND max30=1 AND position=middle THEN output=0

IF max10=1 AND max30 =Z AND position=middle THEN output=0

IF max10=Z AND max30=Z AND position=middle THEN output=0

IF max10=P AND max30=Z AND position=middle THEN output=0

IF max10=1 AND max30=P AND position=middle THEN output=0

IF max10=Z AND max30=P AND position=middle THEN output=0

IF max10=P AND max30=P AND position=middle THEN output=0

IF max10=1 AND max30=1 AND position=high THEN output=0

IF max10=Z AND max30=1 AND position=high THEN output=0

IF max10=P AND max30=1 AND position=high THEN output=0

IF max10=1 AND max30=Z AND position=high THEN output=0

IF max10=Z AND max30=Z AND position=high THEN output=0

IF max10=P AND max30=Z AND position=high THEN output=1

IF max10=1 AND max30=P AND position=high THEN output=0

IF max10=Z AND max30=P AND position=high THEN output=1

IF max10=P AND max30=P AND position=high THEN output=1

In this basis for rules, the situations under which an expert controller would decide whether a pinching occurs are reflected. Setting of the fuzzy terms (indicated in FIGS. 5 and 6) has been generated from the system's response to current intensity values collected in multiple raisings of the window under different window friction conditions. The fuzzy logic system's output will indicate whether or not a pinch has occurred. Output 1 indicates pinching or entrapment.

In the case of a pinching being detected, a new check will be immediately and successively performed. Thus, after detecting a pinching, a 90% reduction in the duty cycle is proposed, and whether in the next intensity maximum pinching occurs again is checked. It must be pointed out that by doing so, the system keeps achieving adequate detection times in order to adopt effective countermeasures.

This allows setting the fuzzy detection system's parameters to make it more sensible, since although initially it detects friction increases such as pinching, by reducing the power of the motor they will be discarded as possible entrapments.

In conclusion, the proposed fuzzy detection system, in the implementation Example described, will use as inputs the position of the window, the relative increase of the current intensity with regard to a turn and with regard to three turns of the motor, and will use the 90% duty cycle reduction in order to discern between sudden increases in friction and external forces applied to the window.

As referred to, after detecting a pinching, alternatively a 30 to 50 percent reduction of the motor's velocity by means of PWM can be performed in order to discern, applying again said first fuzzy logic algorithm, whether said relative increment of the current intensity, such as a sudden intensity increase, is due to an external force applied to the mobile element or to a stress derived from said mobile element's friction with some guiding parts thereof in its displacement.

Having sufficiently described the invention in order to be carried out by a skilled person, it is insisted on that its object is made extensive to those variations in detail that do not alter its essentiality, which is summarized in the following claims.

The invention claimed is:

1. A method for controlled management of a mobile element, driven by an electric motor, with anti-entrapment or anti-collision safety, said mobile element, being conveniently guided and driven by a DC electric motor with a multipolar permanent magnet, characterized by performing a detection of a situation of entrapment of an object or member interposed in said mobile element's travel, or of a possible collision of said mobile element by means of a first algorithm based on fuzzy logic, which inputs are said mobile element's position and relative increments that can occur in current intensity demanded by the motor at one turn of the motor and after a next, subsequent turn of said motor.

2. A method according to claim 1, characterized in that said next, subsequent turn is the third one, immediately subsequent to the first one in which said relative increment in the intensity of the current demanded by the motor was detected.

3. A method according to claim 1, characterized in that in order to evaluate the increments in the intensity of the current demanded by the motor that can occur, the rippling peaks of said motor's polarization current, measured in a same motor inductor having those intensity values that have the same phase within the current oscillation, are used.

4. A method according to claim 3, characterized in that after a first entrapment or collision detection by application of said first algorithm, the duty cycle of the feed current to the motor is reduced to a 90 percent by means of PWM to discern then, applying again said first fuzzy logic algorithm, whether said current intensity increment, such as a sudden increase, is due to an external force applied to the mobile element or to a stress derived form said mobile element's friction with regard to some guiding parts thereof in its displacement.

5. A method according to claim 3, characterized by comprising a step of control of the mobile element's velocity, in closed loop, using a second fuzzy logic algorithm with information to the same of a desired or reference velocity and evaluation of the deviation with regard to said reference of the actual velocity.

6. A method according to claim 5, characterized in that said actual velocity is measured from said rippling detection of the motor's polarization current.

7. A method according to claim 1, characterized in that in order to evaluate the increments in the intensity of the current demanded by the motor that may occur, an average of the preceding values of said current is used.

8. A method according to claim 1, characterized in that after a first entrapment or collision detection by application of said first algorithm, the motor's velocity is reduced from 30 to a 50 percent by means of PWM to discern, applying then said first fuzzy logic algorithm, whether said current intensity increase is due to an external force applied to the mobile element or to a stress derived from said mobile element's friction with regard to some guiding parts thereof in its displacement.

9. A method according to claim 1, characterized in that the information about the mobile element's position is obtained by means of a rippling detection of the motor's polarization current by means of the sampling frequency variation.

10. A computer program that is susceptible of being directly loaded into digital computer's internal memory and comprises code parts of said computer program in order to carry out the steps of the method of claim 1, executing said first fuzzy logic algorithm.

11. A computer program that is susceptible of being directly loaded in a digital computer's internal memory and comprises code parts of said computer program in order to carry out the steps of claim 5, executing said second fuzzy logic algorithm.

* * * * *